(12) United States Patent
Bruchmann et al.

(10) Patent No.: US 6,794,422 B1
(45) Date of Patent: Sep. 21, 2004

(54) POLYMERIZABLE SOLID ALIPHATIC POLYURETHANES WHICH CONTAIN OLEFINICALLY UNSATURATED DOUBLE BONDS AND WHICH ARE BASED ON LINEAR DIISOCYANATES, AND THEIR USE

(75) Inventors: Bernd Bruchmann, Freinsheim (DE); Reinhold Schwalm, Wachenheim (DE); Wolfgang Paulus, Ober-Olm (DE); Rainer Blum, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/088,530

(22) PCT Filed: Oct. 2, 2000

(86) PCT No.: PCT/EP00/09627

§ 371 (c)(1),
(2), (4) Date: Aug. 15, 2002

(87) PCT Pub. No.: WO00/79061

PCT Pub. Date: Apr. 12, 2001

(30) Foreign Application Priority Data

Oct. 2, 1999 (DE) .......................................... 199 47 522

(51) Int. Cl.$^7$ .............................................. C08G 18/63
(52) U.S. Cl. .............................. 522/90; 528/49; 528/75; 428/423.1
(58) Field of Search ........................ 528/49, 75, 423.1; 522/90

(56) References Cited

U.S. PATENT DOCUMENTS 6,360,974 B1 * 3/2002 Sacharski et al.

FOREIGN PATENT DOCUMENTS

| DE | 24 36 186 | 3/1975 |
|---|---|---|
| DE | 36 36 183 | 3/1988 |
| EP | 0 410 242 | 1/1991 |
| EP | 0 596 460 | 11/1993 |
| EP | 0 650 978 | 10/1994 |
| EP | 0 650 979 | 10/1994 |
| EP | 0 650 985 | 10/1994 |
| EP | 0 924 234 | 6/1999 |
| GB | 2 290 793 | 1/1996 |
| WO | 9535332 | * 12/1995 |
| WO | 99 14254 | 3/1999 |

OTHER PUBLICATIONS

Georg Thieme, ed.; "Oligomers" Roempp Lexikon Lacke und Duckfarben, p. 425 1998.
Georg Thieme, ed.; "Fuellstoffe" Roempp Lexikon Lacke und Druckfarben, pp. 250–252 1998.
Georg Thieme, ed.: "Photoinitiatoren" Roempp Chemie Lexikon, 9$^{th}$ expanded and Rev. Ed., vol. 4, pp. 444–446 1991.
Georg Thieme, ed. Roempp Lexikon Lacke und Druckfarben, p. 354 1998.
Georg Thieme, ed. Roempp Lexicon Lacke und Druckfarben, p. 176 1998.
Georg Thieme, ed.; "Metalloxid–glimmer–pigmante" Roempp Lexikon Lacke und Druckfarben, pp. 380–3811 1998
Georg Thieme, ed.; "Eisenoxid–pigmente" Roempp Lexikon Lacke und Druckfarben, pp. 180–181 1998.
Georg Thieme, ed. "Pigmentorientierung" Roempp Lexikon Lacke und Druckfarben, pp. 451–453 1998.
Georg Thieme, ed. Roempp Lexikon Lacke und Druckfarben, p. 563 1998.
Georg Thieme, ed. Roempp Lexikon Lacke und Druckfarben, p. 567 1998.

* cited by examiner

Primary Examiner—Rachel Gorr
(74) Attorney, Agent, or Firm—Oblon, Spivak, McClelland, Maier & Neustadt, P.C.

(57) ABSTRACT

A polymerizable solid aliphatic polyurethane containing olefinically unsaturated double bonds, having a very narrow melting range within the temperature range from 40 to 200° C., which is preparable from A) at least one linear aliphatic diisocyanate,
B) at least one aliphatic compound containing at least two isocyanate-reactive functional groups and/or water, and
C) at least one olefinically unsaturated compound containing an isocyanate-reactive functional group, and its use as a powder coating material or for preparing powder coating materials.

27 Claims, No Drawings

POLYMERIZABLE SOLID ALIPHATIC POLYURETHANES WHICH CONTAIN OLEFINICALLY UNSATURATED DOUBLE BONDS AND WHICH ARE BASED ON LINEAR DIISOCYANATES, AND THEIR USE

BACKGROUND OF THE INVENTION

1. Field of the Invention

The present invention relates to novel polymerizable solid aliphatic polyurethanes containing olefinically unsaturated double bonds and based on linear diisocyanates. The present invention also relates to the use of the novel aliphatic polyurethanes as novel powder coating materials or for preparing novel powder coating materials. The present invention relates not least to the use of the novel powder coating materials for producing coatings on primed or unprimed substrates.

2. Description of the Background

German patent application DE-A-24 36 186 discloses a polyurethane prepared from tolylene diisocyanate, an aromatic nonlinear diisocyanate, 2-hydroxyethyl methacrylate, and trimethylolpropane in a molar ratio of 3:3:1. The polyurethane has a melting point of approximately 65° C. and a polymerizable double bond content of 2.9 double bonds per 1000 molecular weight. It can be used per se as a powder coating material curable with actinic radiation. Owing to the presence of aromatic structures, the coatings produced from it are not stable to weathering but instead tend to yellow under the effect of sunlight.

European patent application EP-A-0 410 242 discloses polyurethanes containing (meth)acryloyl groups in an amount corresponding to from 3 to 10% by weight, based on the polyurethane, of =C=C= (molecular weight 24). These known polyurethanes have unspecified melting points or melting ranges in the temperature range from 50 to 180° C. They are prepared using isophorone diisocyanate, 4,4'-diisocyanatodicyclohexylmethane, 4,4'-diisocyanatodiphenylmethane, its technical-grade mixtures with 2,4-diisocyanatodiphenylmethane, and, if desired, the higher homologs of these diisocyanates, 2,4-diisocyanatotoluene and its technical-grade mixtures with 2,6-diisocyanatotoluene (tolylene diisocyanate), and also biuret-, isocyanurate- or urethane-modified polyisocyanates based on these simple polyisocyanates. As regards the polyurethanes based on aromatic polyisocyanates, the comments made above apply. Additionally it is difficult to use these polyisocyanates as a basis for preparing polyurethanes having a particularly narrow melting range, let alone a defined melting point. In particular, the use of polyisocyanates having an average functionality >2 leads to polyurethanes having an undesirably broad molecular weight distribution, making them of only limited usefulness in one-component powder coating materials.

SUMMARY OF THE INVENTION

It is an object of the present invention to find novel polymerizable solid polyurethanes, containing olefinically unsaturated double bonds, which no longer have the disadvantages of the prior art but instead possess a very narrow melting range within the temperature range 40 to 200° C. and can be used as powder coating materials or for preparing powder coating materials which give weathering-stable and nonyellowing coatings.

Found accordingly has been the novel polymerizable solid aliphatic polyurethane containing olefinically unsaturated double bonds and having a very narrow melting range within the temperature range from 40 to 200° C., which is preparable from A) at least one linear aliphatic diisocyanate,
B) at least one aliphatic compound containing at least two isocyanate-reactive functional groups and/or water, and
C) at least one olefinically unsaturated compound containing an isocyanate-reactive functional group.

DETAILED DESCRIPTION OF THE PREFERRED EMBODIMENTS

The novel polymerizable solid aliphatic polyurethane containing olefinically unsaturated double bonds is referred to below as "polyurethane of the invention".

Also found has been the novel powder coating material curable thermally and/or with actinic radiation which comprises or consists of at least one polyurethane of the invention and is referred to below as "powder coating material of the invention".

Found in addition have been novel coatings for primed or unprimed substrates that are produced from the powder coating material of the invention and are referred to below as "coatings of the invention".

Found not least have been primed or unprimed substrates which have at least one coating of the invention and are referred to below as "substrates of the invention".

Further subject matter of the invention will emerge from the description hereinbelow.

In the light of the prior art it was surprising and unforeseeable for the skilled worker that the object on which the present invention is based could be achieved by means of the polyurethanes of the invention. In particular it was surprising that the polyurethanes of the invention have very narrow melting ranges or even sharp melting points and are therefore especially suitable for preparing powder coating materials. It was also surprising that the powder coating materials of the invention can be prepared, applied and cured simply and that the coatings of the invention produced using them are not only stable to weathering and free from yellowing but also exhibit outstanding leveling and outstanding optical properties.

Within the temperature range from 40 to 200° C., in particular 60 to 185° C., the polyurethane of the invention has a very narrow melting range. In the context of the present invention, a melting range is a temperature range at whose lowest temperature the polyurethane of the invention begins to melt and at whose highest temperature the polyurethane of the invention is completely melted. This melting range preferably has a breadth of from 0.5 to 10° C., in particular from 1 to 6° C. Particularly advantageous polyurethanes of the invention have a sharp melting point lying within the temperature range indicated above.

The polyurethane of the invention contains terminal and/or lateral olefinically unsaturated double bonds. Terminal olefinically unsaturated double bonds are of advantage and are therefore used with preference.

The olefinically unsaturated double bonds may be present in any of a very wide variety of organic groups. What is essential is that the olefinically unsaturated double bonds are sufficiently reactive to be polymerizable. Examples of suitable organic groups containing olefinically unsaturated double bonds are (meth)acrylate, vinyl ether, vinyl ester, allyl, allyl ether and/or allyl ester groups, preferably methacrylate and/or acrylate groups. Of these, the acrylate groups offer particular advantage and are therefore used with particular preference.

The polyurethane of the invention is preparable from at least one linear aliphatic diisocyanate A). Highly suitable linear aliphatic diisocyanates A) for use in accordance with the invention have an unbranched linear carbon chain of from 2 to 20 carbon atoms, in particular an even number of carbon atoms, a cycloaliphatic ring having an even number of carbon atoms or an unbranched linear carbon chain of from 2 to 20 carbon atoms which contains at least one cycloaliphatic ring having an even number of carbon atoms. At each end of the carbon chain or on the two carbon atoms of the cycloaliphatic ring that are positioned parallel to one another there is an isocyanate group.

Examples of suitable unbranched linear carbon chains derive from the alkanes ethane, propane, butane, pentane, hexane, heptane, octane, nonane, decane, undecane, dodecane, tridecane, tetradecane, pentadecane, hexadecane, heptadecane, octadecane, nonadecane, and eicosane, especially butane, hexane, octane, decane, dodecane, and tetradecane.

Examples of suitable cycloaliphatic rings derive from the cycloalkanes cyclobutane, cyclohexane, and cyclooctane, especially cyclohexane.

Examples of suitable unbranched linear carbon chains containing at least one even-numbered cycloaliphatic ring derive from the alkyl-substituted cycloalkanes 1,3-dimethylcyclobutane, 1,4-dimethylcyclohexane, 1-methyl-4-ethylcyclohexane, 1,4-diethylcyclohexane, 1,4-dipropylcyclohexane, 1-ethyl-4-propylcyclohexane, 1,4-di-n-butylcyclohexane, 1,5-dimethylcyclooctane, and 1,5-diethylcyclooctane, especially 1,4-dimethylcyclohexane.

Examples of especially suitable diisocyanates A) are tetramethylene 1,4-diisocyanate, hexamethylene 1,6-diisocyanate, octane-1,8-diyl diisocyanate, decane -1,10-diyl diisocyanate, dodecane-1,12-diyl diisocyanate, tetradecane-1,14-diyl diisocyanate, cyclohexane-1,4-diyl diisocyanate or 1,4-bis(isocyanatomethyl) cyclohexane.

Further examples of especially suitable diisocyanates A) are linear oligomeric or polymeric diisocyanates A) which are obtainable by the reaction of at least one of the above-described monomeric diisocyanates A) with at least one of the compound B) described below containing at least two isocyanate-reactive functional groups. In this case the molar proportions are chosen, as is known, in such a way as to give urethane prepolymers terminated by isocyanate groups.

In the context of the present invention, oligomeric diisocyanates A) are urethane prepolymers which contain in their molecule at least 2 to 15 repeating monomer units. In the context of the present invention, polymeric diisocyanates A) are urethane prepolymers which contain in their molecule at least 10 repeating monomer units. For further details of these terms, refer to Römpp Lexikon Lacke und Druckfarben, Georg Thieme Verlag, Stuttgart, New York, 1998, "oligomers", page 425.

The further essential starting product for the preparation of the polyurethanes of the invention is at least one aliphatic compound B) containing at least two isocyanate-reactive functional groups.

Instead of this compound B) or in addition thereto it is also possible to use water, which, as is known, reacts with two isocyanate groups to form a urea group, with the elimination of carbon dioxide.

The compound B) is linear or branched.

The aliphatic compound B) contains two, three or four isocyanate-reactive functional groups. In very specific cases it is also possible for more than four isocyanate-reactive functional groups to be employed, five or six for example. In accordance with the invention it is of advantage to employ two or three, but especially two, of these functional groups.

Examples of suitable isocyanate-reactive functional groups are amino groups, thiol groups, and hydroxyl groups. The compound B) contains either amino groups, thiol groups or hydroxyl groups or combinations of these groups; for example, amino groups and thiol groups, amino groups and hydroxyl groups, thiol groups and hydroxyl groups, or amino groups, thiol groups, and hydroxyl groups. In accordance with the invention it is of advantage to use amino groups and/or hydroxyl groups, but especially hydroxyl groups.

Accordingly, the preferred compounds B) comprise linear or branched diamines, triamines, amino alcohols containing two amino groups and one hydroxyl group, containing one amino group and two hydroxyl groups, containing one tertiary amino group and three hydroxyl groups, or containing one amino group and one hydroxyl group, or diols, triols, tetrols or sugar alcohols, especially those having a molecular weight of from 62 to 200 daltons.

Examples of suitable diamines B) are ethylenediamine, trimethylenediamine, tetramethylenediamine or hexamethylenediamine.

Examples of suitable triamines B) are diethylenetriamine or ethylenepropylenetriamine.

The diamines and triamines B) are preferably not used as the sole compounds B) but rather in combination with the amino alcohols and polyols B).

Examples of suitable amino alcohols B) containing two amino groups and one hydroxyl group are 2-hydroxytrimethylenediamine or 2-hydroxytetramethylenediamine.

Examples of suitable amino alcohols B) containing one amino group and two hydroxyl groups are diethanolamine or dipropanolamine.

Examples of suitable amino alcohols B) containing one tertiary amino group and three hydroxyl groups are triethanolamine or tripropanolamine.

Examples of suitable amino alcohols B) containing one amino group and one hydroxyl group are ethanolamine or propanolamine.

Examples of suitable unbranched diols B) are low molecular weight diols such as ethylene glycol, propylene glycol, 1,3-propanediol, butylene glycol, 1,5-pentanediol, 1,6-hexanediol, 1,4-cyclohexanediol, 1,4-cyclohexanedimethanol, diethylene glycol, dipropylene glycol or dibutylene glycol.

Examples of suitable oligomeric or polymeric diols B) are triethylene glycol, polyethylene glycol, polypropylene glycol, poly(co-ethylene-co-propylene glycol) or tetrahydrofuran with a number-average molecular weight of more than 500 daltons, especially those having a narrow molecular weight distribution, which are also referred to as polyetherdiols.

Further examples of suitable oligomeric or polymeric diols B) are linear aliphatic polyesterpolyols.

As is known, linear aliphatic polyesterpolyols B) are obtainable by reacting linear aliphatic dicarboxylic acids and, if desired, tricarboxylic or tetracarboxylic acids and monocarboxylic acids in minor amounts or the esterifiable derivatives of these carboxylic acids, such as the anhydrides—where they exist—or the methyl, ethyl, propyl or butyl esters, with diols. In the context of the present invention, minor amounts are amounts which first cause no gelling of the polyesters (tricarboxylic or tetracarboxylic acids) and secondly do not terminate the polycondensation too early (monocarboxylic acids).

Examples of suitable linear aliphatic dicarboxylic acids are 1,3-cyclobutanedicarboxylic acid, 1,4-cyclohexanedicarboxylic acid, malonic acid, succinic acid, glutaric acid, adipic acid, pimelic acid, suberic acid, azelaic acid, sebacic acid, undecanedicarboxylic acid or dodecanedicarboxylic acid.

Examples of suitable tricarboxylic acids or tetracarboxylic acids are 1,2,4-cyclohexanetricarboxylic acid or 1,2,4,5-cyclohexanetetracarboxylic acid.

Examples of suitable monocarboxylic acids are caproic acid, caprylic acid, capric acid, lauric acid, palmitic acid or stearic acid.

Examples of suitable linear aliphatic diols for preparing the linear polyesterdiols B) are the above-described diols B).

Examples of suitable branched aliphatic diols for preparing the linear polyesterdiols B) are neopentyl glycol, the positionally isomeric diethyloctanediols or diols of the formula I or II:

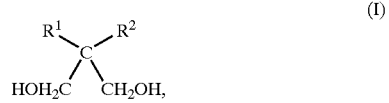

in which $R^1$ and $R^2$ each denote an identical or different radical and stand for an alkyl radical having from 1 to 18 carbon atoms or a cycloaliphatic radical, with the proviso that $R^1$ and/or $R^2$ must not be methyl;

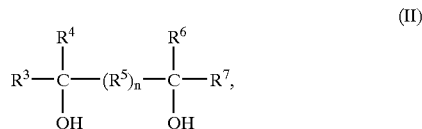

in which $R^3$, $R^4$, $R^6$ and $R^7$ each denote identical or different radicals and stand for an alkyl radical having from 1 to 6 carbon atoms or cycloalkyl radical and $R^5$ denotes an alkyl radical having from 1 to 6 carbon atoms, an aryl radical or an unsaturated alkyl radical having from 1 to 6 carbon atoms, and n is either 0 or 1.

Suitable diols I of the general formula I are all propanediols of the formula in which either $R^1$ or $R^2$ or $R^1$ and $R^2$ is not methyl, such as, for example, 2-butyl-2-ethylpropane-1,3-diol, 2-butyl-2-methylpropane-1,3-diol, 2-propyl-2-ethylpropane-1,3-diol, 2-di-tert-butylpropane-1,3-diol, 2-butyl-2-propylpropane-1,3-diol, 1-dihydroxymethylbicyclo[2.2.]heptane, 2,2-diethylpropane-1,3-diol, 2,2-dipropylpropane-1,3-diol or 2-cyclohexyl-2-methylpropane-1,3-diol.

As diols II of the general formula II it is possible for example to use 2,5-dimethylhexane-2,5-diol, 2,5-diethylhexane-2,5-diol, 2-ethyl-5-methylhexane-2,5-diol or 2,4-dimethylpentane-2,4-diol.

The branched aliphatic diols may also be used per se as diols B). In both utilities they are advantageously used not as the sole diols but instead in a mixture with linear aliphatic compounds B). In that case the latter are preferably present in excess, i.e., at more than 50 mol%, in the mixture of compounds B).

The preparation of the linear aliphatic polyesterdiols B) has no special features in terms of its method but instead takes place in accordance with the customary and known methods of polyester chemistry, preferably in the presence of small amounts of a suitable solvent as azeotrope former. Examples of azeotrope formers used include aromatic hydrocarbons, such as xylene in particular, and (cyclo) aliphatic hydrocarbons, e.g., cyclohexane or methylcyclohexane.

Further examples of suitable oligomeric or polymeric linear aliphatic polyesterdiols B) are polyesterdiols obtained by reacting a lactone with a diol. They are distinguished by the presence of terminal hydroxyl groups and repeating polyester fractions of the formula —(—CO—(CHR$^8$)$_m$—CH$_2$—O—)—. In this formula the index m is preferably from 4 to 6 and the substituent $R^8$=hydrogen or an alkyl, cycloalkyl or alkoxy radical. No substituent contains more than 12 carbon atoms. The total number of carbon atoms in the substituent does not exceed 12 per lactone ring. Examples thereof are hydroxycaproic acid, hydroxybutyric acid, hydroxydecanoic acid and/or hydroxystearic acid.

For preparing the polyesterdiols B) of this kind preference is given to the unsubstituted caprolactone, in which m has the value 4 and all $R^8$ substituents are hydrogen. The reaction with lactone is initiated by low molecular weight polyols such as ethylene glycol, 1,3-propanediol, 1,4-butanediol or dimethylolcyclohexane. It is, however, also possible to react other reaction components, such as ethylenediamine, alkyldialkanolamines or else urea, with caprolactone. Other suitable diols of relatively high molecular weight include polylactamdiols, which are prepared by reacting, for example, caprolactam with low molecular weight diols.

Examples of highly suitable linear aliphatic polyesterdiols B) of the type described above are the polycaprolactonediols sold under the brand name CAPA® by Solvay Interox.

Examples of suitable triols B) are trimethylolethane, trimethylolpropane or glycerol, especially trimethylolpropane.

Examples of suitable tetrols B) are pentaerythritol or homopentaerythritol.

Examples of suitable higher polyfunctional polyols B) are sugar alcohols such as threitol, erythritol, arabitol, adonitol, xylitol, sorbitol, mannitol or dulcitol.

All of the compounds B) described above may be used, as already mentioned above, for preparing the oligomeric and polymeric diisocyanates A).

In accordance with the invention it is of advantage to select the compounds A) and the compounds B) so as to give polyurethanes of the invention whose soft phase has a glass transition temperature Tg <25° C.

The third inventively essential starting product for preparing the polyurethanes of the invention is at least one olefinically unsaturated compound C) containing an isocyanate-reactive functional group.

Although in accordance with the invention it is also possible to employ aromatic compounds containing at least one group having at least one olefinically unsaturated double bond, such as styrene derivatives, for example, as compounds C), it is nevertheless of advantage in accordance with the invention if the compounds C) contain no aromatic groups.

Examples of suitable isocyanate-reactive functional groups are those described above, particularly the hydroxyl group.

Examples of suitable olefinically unsaturated groups are (meth)acrylate, vinyl ether, vinyl ester, allyl, allyl ether and/or allyl ester groups, preferably methacrylate, acrylate and/or allyl groups, but especially acrylate groups.

The compound C) for use in accordance with the invention contains one olefinically unsaturated double bond or two or three olefinically unsaturated double bonds. In specific cases it may also contain more than three olefinically unsaturated double bonds. Of advantage in accordance with the invention is one olefinically unsaturated double bond.

Examples of highly suitable compounds C) for use in accordance with the invention are, accordingly, customary and known monomers which carry per molecule at least one hydroxyl group, such as allyl alcohol;

hydroxyalkyl esters of acrylic acid or of methacrylic acid, especially of acrylic acid, which are obtainable by esterifying aliphatic diols, the above-described low molecular mass diols B) for example, with acrylic acid or methacrylic acid or by reacting acrylic acid or methacrylic acid with an alkylene oxide; especially hydroxyalkyl esters of acrylic acid or methacrylic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl or bis(hydroxymethyl) cyclohexane acrylate or methacrylate; or reaction products of cyclic esters, such as epsilon-caprolactone, and these hydroxyalkyl or hydroxycycloalkyl esters.

The polyurethanes of the invention are advantageously prepared by (1) reacting at least one diisocyanate A) with at least one compound C) in a molar ratio A):C) of 1:1 to give an adduct A/C) containing one isocyanate group and one olefinically unsaturated group, and then (2) reacting the adduct A/C) with at least one compound B) in a molar ratio A/C):B) of x:1, wherein x is the number of the isocyanate-reactive groups in the at least one compound B), to give the polyurethanes of the invention.

According to another advantageous variant, the polyurethanes of the invention are prepared by (1) reacting at least one diisocyanate A) with at least one compound B) in a molar ratio A):B) of x:1, wherein x is the number of the isocyanate-reactive groups in the at least one compound B) to give the adduct A/B) containing x isocyanate groups, and then (2) reacting the adduct A/B) with at least one compound C) in a molar ratio C):A/B) of x:1, wherein x is the number of the isocyanate groups in the adduct A/B) to give the aliphatic polyurethanes.

In accordance with the invention it is of advantage if x is a number, in particular a whole number, from 2 to 6, preferably 2 to 5, with particular preference 2 to 4, with very particular preference 2 and 3, and in particular 2.

Viewed in terms of their methods, the processes have no special features but instead take place in accordance with the customary and known methods of organic isocyanate chemistry. The reactions are preferably conducted under inert gas using temperatures from 20 to 120° C., preferably from 30 to 100° C., more preferably from 40 to 80° C., and particularly from 50 to 70° C. In general it is advisable to conduct the reactions in an organic solvent or solvent mixture that is not isocyanate-reactive. Examples of suitable organic solvents are ketones or esters such as methyl ethyl ketone, methyl isobutyl ketone or ethoxyethyl propionate. It is further of advantage to use customary and known catalysts such as dibutyltin dilaurate, lithium decanoate or zinc octoate in effective amounts. The resulting polyurethane of the invention can be isolated and purified by evaporating the solution down and/or by crystalization and/or recrystalization.

The polyurethane of the invention can be used as a powder coating material or for preparing powder coating materials.

The powder coating materials of the invention based on at least one polyurethane of the invention are curable thermally and/or with actinic radiation. In the case of combined thermal curing and curing with actinic radiation, the term "dual cure" is also used.

The composition of the powder coating materials of the invention may be varied extremely widely, which is an entirely western advantage. The composition is guided on the one hand by the curing method or curing methods that is (are) to be employed and secondly by the intended use of the powder coating materials (pigment-free clearcoat material or pigmented color and/or effect coating material).

Examples of suitable further constituents for use in the powder coating materials of the invention are oligomers and/or polymers which are curable thermally and/or with actinic radiation and have a glass transition temperature Tg of more than 40° C., such as linear and/or branched and/or block, comb and/or random poly(meth)acrylates or acrylate copolymers, polyesters, alkyds, polyurethanes, acrylated polyurethanes, acrylated polyesters, polylactones, polycarbonates, polyethers, epoxy resin-amine adducts, (meth)acrylatediols, partially hydrolyzed polyvinyl esters or polyureas which are curable thermally and/or with actinic radiation, or (meth)acryloyl-functional (meth)-acrylate copolymers, polyether acrylates, polyester acrylates, unsaturated polyesters, epoxy acrylates, urethane acrylates, amino acrylates, melamine acrylates, silicone acrylates, and the corresponding methacrylates, which are curable with actinic radiation.

Examples of especially suitable oligomers or polymers which can be used as further ingredients in the powder coating materials of the invention are the crosslinkable copolymers such as are described in European patents EP-A-0 650 985, EP-A-0 650 978 or EP-A-0 650 979.

Furthermore, the powder coating materials of the invention may comprise customary coatings additives. Examples of suitable customary coatings additives for use in the powder coating materials of the invention are customary and known reactive diluents curable thermally and/or with actinic radiation, such as positionally isomeric diethyloctanediols or hydroxyl-containing hyperbranched compounds or dendrimers, (meth)acrylates with a functionality of two or more, or polyisocyanates containing (meth)acrylate groups;

other crosslinking agents such as amino resins, compounds or resins containing anhydride groups, compounds or resins containing epoxide groups, tris (alkoxycarbonylamino)triazines, compounds or resins containing carbonate groups, blocked and/or non-blocked polyisocyanates, beta-hydroxyalkylamides, and compounds containing on average at least two groups capable of transesterification, examples being reaction products of malonic diesters and polyisocyanates or of esters and partial esters of polyhydric alcohols of malonic acid with monoisocyanates, such as are described in European patent EP-A-0 596 460;

UV absorbers;

light stabilizers such as HALS compounds, benzotriazoles or oxalanilides;

free radical scavengers;

thermolabile free-radical initiators such as organic peroxides, organic azo compounds or C—C— cleaving initiators such as dialkyl peroxides, peroxocarboxylic acids, peroxodicarbonates, peroxide esters, hydroperoxides, ketone peroxides, azodinitriles or benzpinacol silyl ethers;

crosslinking catalysts such as dibutyl tin dilaurate, lithium decanoate or zinc octoate;

devolatilizers such as diazadicycloundecane or benzoin;

photoinitiators such as those of the Norrish II type, whose mechanism of action is based on an intramolecular variant of the hydrogen abstraction reactions such as occur diversely in photochemical reactions (by way of example, reference may be made here to Römpp Chemie Lexikon, 9th expanded and revised edition, Georg Thieme Verlag Stuttgart, vol. 4, 1991) or cationic photo-initiators (by way of example, reference may be made here to Römpp Lexikon Lacke und Druckfarben, Georg Thieme Verlag Stuttgart, 1998, pages 444 to 446), especially benzophenones, benzoins or benzoin ethers or phosphine oxides;

slip additives;

polymerization inhibitors;

adhesion promoters such as tricyclodecane-dimethanol;

leveling agents;

transparent fillers based on silicon dioxide, aluminum oxide, titanium dioxide or zirconium oxide; for further details refer to Römpp Lexikon Lacke und Druckfarben, Georg Thieme Verlag, Stuttgart, 1998, pages 250 to 252;

flame retardants;

flatting agents such as magnesium stearate;

electrically conductive pigments, such as metal pigments, conductivity blacks, doped pearlescent pigments or conductive barium sulfate. Especially suitable electrically conductive pigments are the conductivity blacks; for further details refer to Römpp Lexikon Lacke und Druckfarben, Georg Thieme Verlag, Stuttgart, New York, 1998, "metal pigments", p. 381, and "conductive pigments", p. 354;

effect pigments, such as metal flake pigments such as commercial aluminum bronzes, aluminum bronzes chromated in accordance with. DE-A-36 36 183, and commercial stainless steel bronzes, and also nonmetallic effect pigments such as pearlescent pigments and interference pigments; for further details refer to Römpp Lexikon Lacke und Druckfarben, Georg Thieme Verlag, 1998, pages 176, "effect pigments", and pages 380 and 381, "metal oxide-mica pigments" to "metal pigments";

inorganic color pigments such as titanium dioxide, iron oxides, Sicotrans yellow, and carbon black or organic color pigments such as thioindigo pigments indanthrene blue, Cromophthal red, Irgazine orange, and Heliogen green; for further details refer to Römpp Lexikon Lacke und Druckfarben, Georg Thieme Verlag, 1998, pages 180 and 181, "iron blue pigments" to "black iron oxide", pages 451 to 453 "pigments" to "pigment volume concentration", page 563 "thioindigo pigments", and page 567 "titanium dioxide pigments", or organic and inorganic fillers such as chalk, calcium sulfates, barium sulfate, silicates such as talc or kaolin, silicas, oxides such as aluminum hydroxide, magnesium hydroxide, or organic fillers such as textile fibers, cellulose fibers, polyethylene fibers or wood flour; for further details refer to Römpp Lexikon Lacke und Druckfarben, Georg Thieme Verlag, 1998, pages 250 ff., "fillers".

Further examples of suitable coatings additives are described in the textbook "Lackadditive" [Additives for coatings] by Johan Bieleman, Wiley-VCH, Weinheim, New York, 1998.

These additives are added to the powder coating materials of the invention in customary and known, effective amounts, which depending on additive may be from 0.001 to 500 parts by weight per 100 parts by weight of polyurethane of the invention.

The preparation of the powder coating materials of the invention has no special features as far as its method is concerned but instead takes place in a customary and known manner, preferably by mixing of the ingredients in the melt, by extrusion or kneading, discharging the melt from the mixing unit, solidifying the resulting homogenized mass, comminuting the mass until the desired particle size results, and, where appropriate, sieving the resulting powder coating material of the invention under conditions under which there is no premature thermal crosslinking and/or crosslinking with actinic radiation and/or other damage to individual ingredients of the powder coating material of the invention, as a result, for example, of thermal degradation.

In this context it proves a further particular advantage of the powder coating material of the invention that it can be dispersed in water to give a powder slurry coating material of the invention.

The application of the powder coating material of the invention also has no special features as far as its method is concerned but instead takes place by means of customary and known techniques and apparatus, by electrostatic spraying, for example, for which again conditions are employed under which there is no premature thermal crosslinking and/or crosslinking with actinic radiation and/ or other damage to individual ingredients of the powder coating material of the invention, as a result, for example, of thermal degradation.

The powder slurry coating material of the invention, on the other hand, can be applied by means of techniques and apparatus such as are commonly employed for the application of spray coating materials.

The powder coating material of the invention and the powder slurry coating material of the invention can be applied in any of a wide variety of film thicknesses to give coatings with any of a wide variety of thicknesses, in particular from 10 to 250 μm. The thickness of the coatings is guided by the intended use of the coatings and can therefore be adjusted readily by the skilled worker.

The curing of the applied powder coating films also has no special features as far as its method is concerned; instead, the customary and known techniques and apparatus are employed.

Accordingly, curing with actinic radiation can be carried out using electromagnetic radiation such as X-rays, UV radiation, visible light or near IR (NIR) light or using corpuscular radiation such as electron beams. Techniques and apparatus for curing with actinic radiation are customary and known and are described, for example, in R. Holmes, "U. V. and E. B. Curing Formulations for Printing Inks", Coatings and Paints, SITA Technology, Academic Press, London, United Kingdom 1984.

Thermal curing likewise has no special features as far as its method is concerned but instead takes place in accordance with the customary and known methods such as heating in a forced air oven or irradiation using IR lamps.

Suitable substrates include all surfaces to be coated on articles that are amenable to curing of the coating films present thereon using heat and/or actinic radiation; examples are articles made of metals, plastics, wood, ceramic, stone, textile, fiber composites, leather, glass, glass fibers, glass wool and rock wool or mineral-bound and resin-bound building materials, such as plasterboard, cement slabs or roofing shingles. Accordingly, the powder coating material or powderslurry coating material of the invention, especially as a clearcoat material, is suitable for applications in automobile finishing, in the coating of furniture, and in industrial coating, including coil coating, container coating, and the coating of electrical components, to a high degree. In the context of the industrial coatings it is suitable for coating virtually all parts for private or industrial use such as radiators, domestic appliances, small metal parts, hubcaps, wheel rims or windings of electrical motors.

The clearcoat of the invention is particularly suitable as a coating over basecoat materials, preferably in the automobile industry. It is especially suitable as a clearcoat over aqueous basecoat materials based on polyesters, polyurethane resins, and amino resins.

The metallic substrates employed in this context may have a primer system, in particular a cathodically or anodically deposited and thermally cured electrocoat. Where appropriate, the electrocoat may also have been coated with an antistonechip primer or with a surfacer.

With the powder coating and powderslurry coating material of the invention it is also possible in particular to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PC, PET, PMMA, PP, PS, SB, PUR, PVC, RF, SAN, PBT, PPE, POM, PUR-RIM, SMC, BMC, PP-EPDM, and UP (abbreviations in accordance with DIN 7728T1). The plastics to be coated can of course also be polymer blends, modified plastics or fiber reinforced plastics. It is also possible to employ them for the coating of plastics commonly used in vehicle construction, especially motor vehicle construction.

In the case of nonfunctionalized and/or apolar substrate surfaces, these may be subjected prior to coating in the known manner to a pretreatment with a plasma or by flaming and/or may be coated with a hydroprimer system comprising a hydroprimer.

The coatings of the invention produced from the powder coating materials and powderslurry coating materials of the invention exhibit outstanding leveling and have an outstanding overall appearance. They are stable to weathering and do not yellow even in a tropical climate. They can therefore be used for numerous utilities inside and out. Accordingly, primed and unprimed substrates, especially bodies of automobiles and commercial vehicles, industrial components, including plastics parts, packaging, coils, and electrical components, or furniture that have been coated with at least one coating of the invention have particular technical and economic advantages, in particular a long surface life, which makes them particularly attractive for the users.

EXAMPLES

Examples 1 to 16

The preparation of the polyurethanes 1 to 16 of the invention

For the preparation of the polyurethanes 1 to 16 of the invention an adduct of hexamethylene diisocyanate and hydroxyethyl acrylate (molar ratio 1:1) was first of all prepared in accordance with the following instructions:

1680 parts by weight of hexamethylene diisocyanate and 0.84 parts by weight of dibutyltin dilaurate (500 ppm based on hexamethylene diisocyanate) were charged under nitrogen to a suitable reaction vessel and heated to 60° C. At this temperature, 116 parts by weight of hydroxyethyl acrylate were added dropwise over the course of 30 minutes. Thereafter the resulting reaction mixture was left to react at 60° C. for 60 minutes. Subsequently the reaction mixture was freed from monomeric hexamethylene diisocyanate by distilling it on a thin film evaporator at an oil temperature of 165° C. under a pressure of 2.5 mbar. The resulting adduct was a viscous oil which slowly crystalized at room temperature. Its residual monomer content was below 0.2% by weight.

The polyurethanes 1 to 16 of the invention were prepared in accordance with the following general instructions:

0.1 mol of a compound B) (cf. table 1) was dissolved in 250 ml of methyl ethyl ketone. The equimolar amounts of the adducts described above, listed in table 1, were added to the resultant solution. Then 500 ppm, based on the adduct, of dibutyltin dilaurate were added and the resulting reaction mixture was heated to 60° C. It was stirred at this temperature for two hours more, then cooled and held in a refrigerator at 3° C. for twelve hours. The solid precipitated was filtered off with suction, washed twice with 50 ml portions of methyl ethyl ketone, and dried in vacuo. The melting points of the polyurethanes 1 to 16 of the invention can be found in table 1.

TABLE 1

Starting products and their molar ratios and also the melting ranges or melting points of the polyurethanes of the invention

| Example No. | Compound B) | Molar ratio melting range/B): adduct A/C) | Melting point (° C.) |
| --- | --- | --- | --- |
| 1 | Ethylene glycol | 1:2 | 124 |
| 2 | 1,2-Propanediol | 1:2 | 91 |
| 3 | 1,3-Propanediol | 1:2 | 118 |
| 4 | 1,3-Butanediol | 1:2 | 97 to 100 |
| 5 | 1,4-Butanediol | 1:2 | 135 |
| 6 | 1,5-Pentanediol | 1:2 | 125 |
| 7 | 1,6-Hexanediol | 1:2 | 128 |
| 8 | CAPA ® 200 | 1:2 | 115 |
| 9 | CAPA ® 212 | 1:2 | 125 to 128 |
| 10 | CAPA ® 222 | 1:2 | 119 to 122 |
| 11 | Ethanolamine | 1:2 | 128 to 130 |
| 12 | 1,4-Cyclohexanediol | 1:2 | 105 to 108 |
| 13 | Glycerol | 1:3 | 105 to 107 |
| 14 | Mannitol | 1:6 | 105 to 108 |
| 15 | Trimethylolethane | 1:3 | 117 to 118 |
| 16 | Water | 1:3 | 120 to 125 |

CAPA ® = polycaprolactonediols from Solvay Interox

The polyurethanes 1 to 16 of the invention were outstandingly suitable for preparing powder coating materials.

Examples 17 to 21

The preparation of the polyurethanes 17 to 21 of the invention

The polyurethanes 17 to 21 of the invention were prepared in accordance with the following general instructions:

0.1 mol of at least one compound B) (cf. table 2) was dissolved in 250 ml of methyl ethyl ketone. To the solution there were added, based on the amount of hexamethylene diisocyanate, 500 ppm of dibutyltin dilaurate, after which the resulting mixture was heated to 70° C. Subsequently the equimolar amount of hexamethylene diisocyanate, as listed in table 2, was added over the course of 10 minutes, after which the resulting reaction mixture was stirred at 70° C. for one hour. Then the equimolar amount of hydroxyethyl acrylate, indicated in table 2, was added over ten minutes. The resulting reaction mixture was further stirred at 70° C. for one hour, after which it was left to cool and held in a refrigerator at 3° C. for twelve hours. The solid precipitated was filtered off with suction, washed twice with 50 ml portions of methyl ethyl ketone, and dried in vacuo. Table 2 gives an overview of the starting products, their molar ratios, and the melting ranges or melting points.

TABLE 2

Starting products and their molar ratios and also the melting ranges or melting points of the polyurethanes of the invention

| Example No. | Compounds B) | Molar ratio B):C):A) | Melting interval/ melting point (° C.) |
|---|---|---|---|
| 17 | 1,4-Butanediol | 1:2:2 | 161 |
| 18 | CAPA ® 222 | 1:2:2 | 120 to 122 |
| 19 | CAPA ® 212 Ethylene glycol | (0.2:0.8): 2:2 | 102 |
| 20 | Ethylene glycol | 1:0.5:1.5 | 145 to 150 |
| 21 | 1,4-Cyclohexanediol | 1:2:2 | 180 to 185 |

A) = hexamethylene diisocyanate;
C) = hydroxyethyl acrylate;
CAPA ® = polycaprolactonediols from Solvay Interox The polyurethanes 17 to 21 of the invention were outstandingly suitable for the preparation of powder coating materials.

What is claimed is:

1. A polymerizable solid aliphatic polyurethane containing one or more olefinically unsaturated double bonds, said polyurethane having a very narrow melting range within the temperature range from 40 to 200° C., said polyurethane prepared by one of two processes (A) or (B) by:
   (A) (i) reacting at least one linear aliphatic diisocyanate A) with at least one olefinically unsaturated compound C) having an isocyanate reactive group in a molar ratio A):C) of 1:1 to give a product consisting of adduct A/C) containing one isocyanate group and one olefinically unsaturated group, and then
   (ii) reacting the adduct A/C) with at least one aliphatic compound B) containing at least two isocyanate-reactive functional groups and/or water in a molar ratio A/C):B) of x:1, wherein x is the number of the isocyanate-reactive groups in the least one aliphatic compound B), to give the aliphatic polyurethane having terminal and/or lateral olefinically unsaturated double bonds, or
   (B) (i) reacting at least one linear aliphatic diisocyanate A) with at least one aliphatic compound B) containing at least two isocyanate-reactive functional groups and/or water in a molar ratio A):B) of x:1, wherein x is the number of the isocyanate-reactive groups in the at least one compound B) to give a product consisting of adduct A/B) containing x isocyanate groups, and then
   (ii) reacting the adduct A/B) obtained with at least one olefinically unsaturated compound C) containing an isocyanate-reactive functional group in a molar ratio C):A/B) of x:1, wherein x is the number of the isocyanate groups in the adduct A/B) to give the aliphatic polyurethane having terminal and/or lateral isocyanate olefinically unsaturated double bonds.

2. The aliphatic polyurethane of claim 1, wherein the polyurethane has a melting range from 0.5 to 10° C.

3. The aliphatic polyurethane of claim 1, wherein the polyurethane has a sharp melting point.

4. The aliphatic polyurethane of claim 1, wherein the polyurethane has a very narrow melting range or a sharp melting point in the temperature range from 60 to 185° C.

5. The aliphatic polyurethane of claim 1, wherein the olefinically unsaturated double bonds are present in (meth) acrylate, vinyl ether, vinyl ester, allyl, allyl ether and/or allyl ester groups.

6. The aliphatic polyurethane of claim 1, wherein the linear aliphatic diisocyanate A) is a monomeric diisocyanate, an oligomeric diisocyanate, a polymeric diisocyanate or mixtures thereof, derived from
   A) at least one linear aliphatic diisocyanate and
   B) at least one aliphatic compound containing at least two isocyanate-reactive functional groups.

7. The aliphatic polyurethane of claim 1, wherein the isocyanate-reactive functional groups are amino groups, thiol groups or hydroxyl groups.

8. The aliphatic polyurethane of claim 7, wherein the aliphatic compound B) is linear.

9. The aliphatic polyurethane of claim 8, wherein the linear aliphatic compound B) is a diamine, triamine, amino alcohol containing at least one amino group and at least one hydroxyl group, diol, triol, tetrol, sugar alcohol or mixtures thereof.

10. The aliphatic polyurethane of claim 9, wherein the linear aliphatic compound B) is a low molecular weight diol, triol, a tetrol, a sugar alcohol having a molecular weight of from 62 to 200 daltons, a linear aliphatic oligomeric polyesterdiol, polymeric polyesterdiol, or polyetherdiol.

11. The aliphatic polyurethane of claim 1, wherein x is a number from 2 to 6.

12. The aliphatic polyurethane of claim 1, wherein the soft phase has a glass transition temperature Tg<25° C.

13. A powder coating material curable thermally and/or curable with actinic radiation which comprises at least one aliphatic polyurethane according to claim 1.

14. The powder coating material of claim 13, further comprising oligomers and/or polymers which are curable thermally and/or with actinic radiation and have a glass transition temperature Tg of more than 40° C.

15. The powder coating material of claim 13, further comprising one or more customary coatings additives.

16. The powder coating material of claim 13, wherein the powder coating material is in the form of a powder slurry coating material.

17. A coating derived from a powder coating material according to claim 13.

18. Primed and unprimed substrates comprising at least one coating according to claim 16.

19. The aliphatic polyurethane of claim 1, wherein the polyurethane has a melting range of from 1 to 6° C.

20. The aliphatic polyurethane of claim 5 wherein, the olefinically unsaturated double bonds are present in methacrylate groups, acrylate groups or mixtures thereof.

21. The aliphatic polyurethane of claim 5, wherein the olefinically unsaturated double bonds are present in acrylate groups.

22. The aliphatic polyurethane of claim 1, wherein the olefinically unsaturated double bonds are terminal.

23. The aliphatic polyurethane of claim 1, wherein the isocyanate-reactive functional groups are amino groups, hydroxyl groups, or mixtures thereof.

24. The aliphatic polyurethane of claim 1, wherein the isocyanate-reactive functional groups are hydroxyl groups.

25. The aliphatic polyurethane of claim 1, wherein x is a whole number.

26. The primed and unprimed substrates of claim 18, wherein the substrates are bodies of automobiles, bodies of commercial vehicles, industrial components, plastic parts, packaging, coils, electrical components, or furniture.

27. A method for preparing powder coating materials, said method comprising mixing the aliphatic polyurethane according to claim 1 with a coating materials to form a powder coating material.

* * * * *

UNITED STATES PATENT AND TRADEMARK OFFICE
CERTIFICATE OF CORRECTION

PATENT NO.        : 6,794,422 B1                                   Page 1 of 1
APPLICATION NO. : 10/088530
DATED             : September 21, 2004
INVENTOR(S)       : Bruchmann et al.

It is certified that error appears in the above-identified patent and that said Letters Patent is hereby corrected as shown below:

On the title page, Item (87), the PCT Publication is incorrect. Item (87) should read:

-- (87) PCT Pub. No.:   WO 01/25306
       PCT Pub. Date:  Apr. 12, 2001 --

Signed and Sealed this

Twenty-fourth Day of April, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,794,422 B1 | Page 1 of 1 |
| APPLICATION NO. | : 10/088530 | |
| DATED | : September 21, 2004 | |
| INVENTOR(S) | : Bruchmann et al. | |

It is certified that error appears in the above-identified patent and that said Letters Patent is hereby corrected as shown below:

On the title page, Item (87), the PCT Publication is incorrect. Item (87) should read:

Item -- (87)　PCT Pub. No.:　WO 01/25306
　　　　　　　PCT Pub. Date:　Apr. 12, 2001　--

Signed and Sealed this

Twenty-second Day of May, 2007

JON W. DUDAS
*Director of the United States Patent and Trademark Office*